(12) United States Patent
Palmer et al.

(10) Patent No.: US 8,792,123 B2
(45) Date of Patent: Jul. 29, 2014

(54) MECHANISM FOR GENERATING PERSONALIZED MAILPIECES IN A MANUFACTURING SYSTEM

(75) Inventors: Dwight Ross Palmer, Longmont, CO (US); Scott Matthew Jones, Westminster, CO (US); Brian Joseph Hogan, Erie, CO (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 97 days.

(21) Appl. No.: 13/474,487

(22) Filed: May 17, 2012

(65) Prior Publication Data

US 2013/0308157 A1 Nov. 21, 2013

(51) Int. Cl.
*G06F 3/12* (2006.01)
*G06F 7/00* (2006.01)
*G06K 9/00* (2006.01)

(52) U.S. Cl.
USPC ............................ 358/1.15; 700/221; 382/101

(58) Field of Classification Search
USPC .......... 700/221; 382/101; 358/1.15, 1.9, 1.12, 358/1.18
See application file for complete search history.

(56) References Cited

U.S. PATENT DOCUMENTS

| | | | |
|---|---|---|---|
| 4,733,856 A | 3/1988 | Gunther, Jr. | |
| 4,800,505 A | 1/1989 | Axelrod et al. | |
| 5,034,985 A * | 7/1991 | Keough | 382/101 |
| 5,983,209 A | 11/1999 | Kara | |
| 6,173,274 B1 | 1/2001 | Ryan, Jr. | |
| 6,901,312 B2 | 5/2005 | Hart, Jr. et al. | |
| 7,123,376 B2 | 10/2006 | Shea | |
| 7,254,931 B2 | 8/2007 | Stemmle et al. | |
| 7,324,921 B2 * | 1/2008 | Sugahara et al. | 702/183 |
| 2004/0051296 A1 * | 3/2004 | MacWilliams et al. | 283/36 |
| 2008/0093793 A1 * | 4/2008 | Ponti | 271/186 |
| 2008/0172145 A1 | 7/2008 | Freyburger et al. | |
| 2010/0110507 A1 | 5/2010 | Sussmeier et al. | |
| 2010/0111356 A1 * | 5/2010 | Berger et al. | 382/101 |
| 2010/0169138 A1 * | 7/2010 | Sagi et al. | 705/7 |
| 2010/0211212 A1 * | 8/2010 | Fijnvandraat | 700/221 |
| 2010/0259790 A1 | 10/2010 | Pagel et al. | |
| 2011/0087746 A1 * | 4/2011 | Sagi et al. | 709/206 |
| 2012/0066060 A1 | 3/2012 | Wilen | |
| 2012/0102278 A1 * | 4/2012 | Joffray et al. | 711/155 |

FOREIGN PATENT DOCUMENTS

JP 2004127015 * 4/2004 ............. G06F 12/14

OTHER PUBLICATIONS

"The Digital Nirvana, Posts Tagged 'wrapped envelope'". The Great Envelope Debate. Retrieved from the Internet at: http://thedigitalnirvana.com/tag/wrap-envelope/., (Jul. 27, 2010), pp. 1-6.

(Continued)

*Primary Examiner* — Jerome Grant, II
(74) *Attorney, Agent, or Firm* — Blakely Sokoloff Taylor & Zafman LLP

(57) ABSTRACT

A manufacturing system is disclosed. The manufacturing system may include a personalization mechanism to evaluate personalization information relating to mailpieces, wherein the mailpieces include mail containers and mail content components. The manufacturing system may further include a matching mechanism to compare the containers with their corresponding content components using unique verification codes assigned to each of the containers and content components, wherein the unique verification codes are assigned based on the evaluated personalization information, and a production machine to produce personalized containers and their corresponding content components based on comparison results of the comparison.

28 Claims, 5 Drawing Sheets

(56) References Cited

OTHER PUBLICATIONS

"Case Study, Wilen Direct. White Paper, Pitney Bowes.", Retrieved from the internet at: http://sf.outputlinks.com/Libraries/PDF%20Uploads/PB_Wilen_Case_Study_PPM.sflb, 2 pages, May 2012.

"DST Output Press Release on Wrap Envelope Technology", Press Release. Retrieved from the Internet at http://dstoutput.com/news/wrap-envelope-technolog, (Jun. 30, 2010), 2 pgs.

\* cited by examiner

MECHANISM FOR GENERATING PERSONALIZED MAILPIECES IN A MANUFACTURING SYSTEM

FIELD

The invention relates to the field of manufacturing systems, and in particular, to personalization of mailpieces at a manufacturing system.

BACKGROUND

Companies that produce large volumes of mailpieces, such as service bureaus, financial institutions, insurance, utilities, etc., recognize the importance of optimizing the manufacturing process that prepares the mailpieces or mail items for delivery to the post office for mailing. These companies may produce millions of mailpieces per day, so even a small reduction in the production cost or postage cost per each mailpiece could save resources and reduce costs.

However, the conventional techniques are severely limited to the extent that some of the techniques serve as a barrier to cost savings, such as using preprinted envelopes which can require a stock change at an inserter and force jobs to be split when a different envelope is needed. Further, typically, envelopes have not been considered a part of the mailpiece that can be personalized for each recipient.

SUMMARY

In one embodiment a manufacturing system is disclosed. The manufacturing system may include a personalization mechanism to evaluate personalization information relating to mailpieces, wherein the mailpieces include mail containers and mail content components. The manufacturing system may further include a matching mechanism to compare the containers with their corresponding content components using unique verification codes assigned to each of the containers and content components, wherein the unique verification codes are assigned based on the evaluated personalization information, and a production machine to produce personalized containers and their corresponding content components based on comparison results of the comparison.

In another embodiment, a method includes evaluating personalization information relating to mailpieces, wherein the mailpieces include mail containers and mail content components. The method may further include comparing the containers with their corresponding content components using unique verification codes assigned to each of the containers and content components, wherein the unique verification codes are assigned based on the evaluated personalization information, wherein the containers and their corresponding content components are personalized based on comparison results of the comparison.

In yet another embodiment, a multifunction manufacturing device is disclosed. The multifunction manufacturing device includes a controller to evaluate personalization information relating to mailpieces, wherein the mailpieces include mail containers and mail content components, and comparing the containers with their corresponding content components using unique verification codes assigned to each of the containers and content components, wherein the unique verification codes are assigned based on the evaluated personalization information, wherein the containers and their corresponding content components are personalized based on comparison results of the comparison.

BRIEF DESCRIPTION OF THE DRAWINGS

A better understanding of the present invention can be obtained from the following detailed description in conjunction with the following drawings, in which.

DETAILED DESCRIPTION

Figure 1:
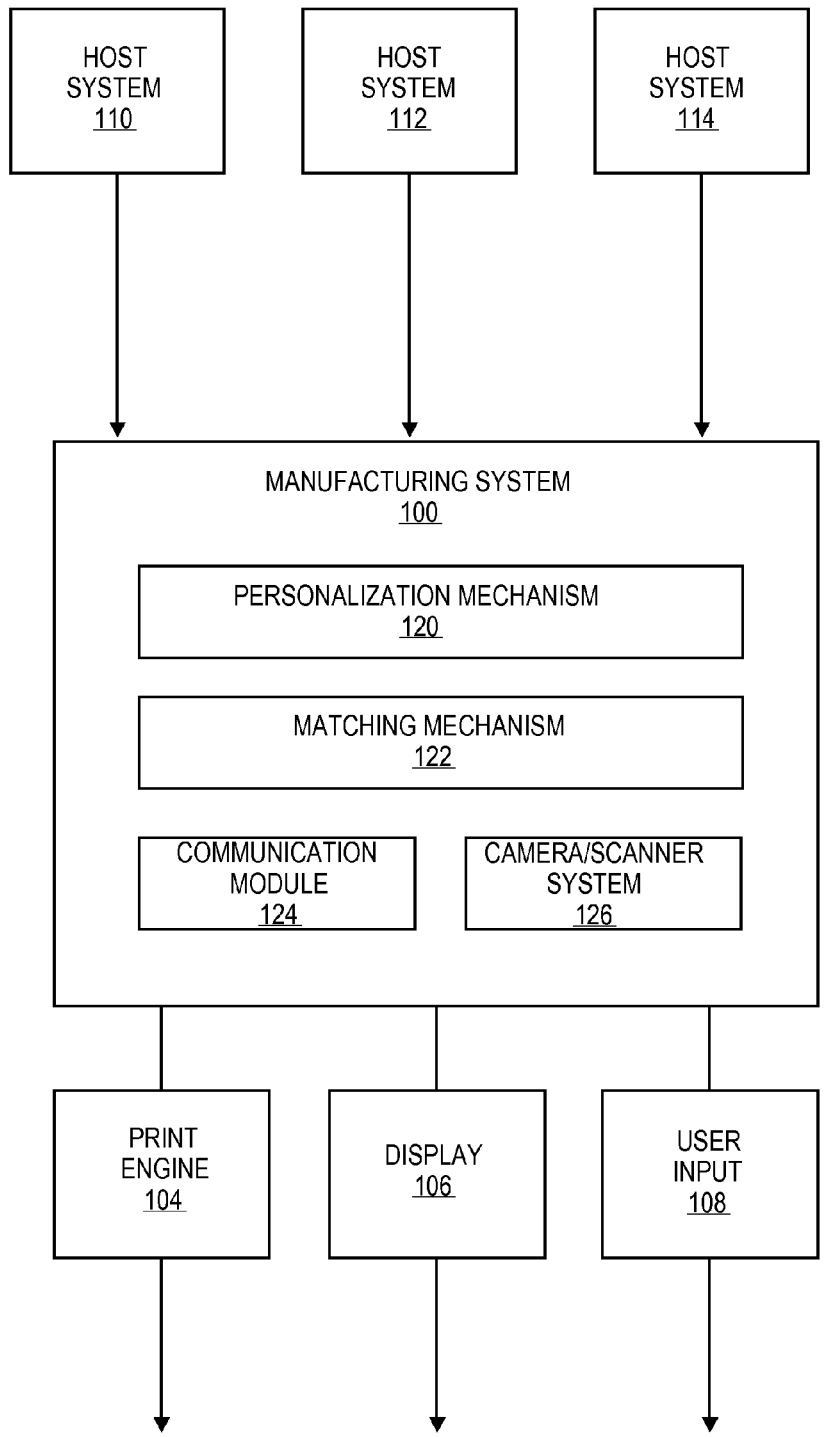
FIG. 1 illustrates an embodiment of a manufacturing system.

FIG. 1 illustrates an embodiment of a manufacturing system 100. Manufacturing system 100 is a system used to provide marks on a media, such as a continuous forms printer or a cut sheet page printer. Manufacturing system 100 may include any digital hardcopy output device, such as printers, copiers, multifunction printers (MFP's), and facsimiles. In one embodiment, manufacturing system 100 is shared by multiple users. In such an embodiment, manufacturing system 100 includes one or more print engines 104. Manufacturing system 100 further includes any system, server, or components operable to interface one or more host systems 110-114 with one or more print engines 104, and to control the printing of print jobs received from the host systems 110-114 on print engine 104. Print engine 104 provides an imaging process to mark a printable medium, such as paper.

According to one embodiment, manufacturing system 100 includes personalization mechanism 120 and matching mechanism 122 along with communication module 124 and camera/scanner system 126 to define and generate personalization of mailpieces. In one embodiment, camera/scanner system 126 may include one or more scanners to scan various forms of codes (e.g., a scanner capable of scanning a barcode). Manufacturing system 100 may include multiple displays 106 and one or more user input components 108. Although the term "mailpieces" is used throughout this document, it is not limited to any particular item and that it may include any number, form and type of items including mail-related items, such as various types, forms and sizes of mail containers (e.g., envelopes, boxes, tubes, etc.) and mail content components that are inserted into or carried in a mail container. Examples of mail content components include, but are not limited to, one or more of a utility bill, a credit card statement, a bank statement, a letter, a note, a commercial advertisement, a political advertisement, a marketing insert, a public announcement, and any number and types of other items, such as a teddy bear or a pair of socks personalized with a child's name embroidered on to the box serving as a mail container for the teddy bear and/or the pair of socks and having printed on it the child's address, and the like. It is contemplated that mailpieces can be of various types, shapes, and forms, but for brevity, clarity and ease of understanding, envelopes and certain mail inserts are used as examples of mail containers and mail content components, respectively, throughout this document.

Figure 2:
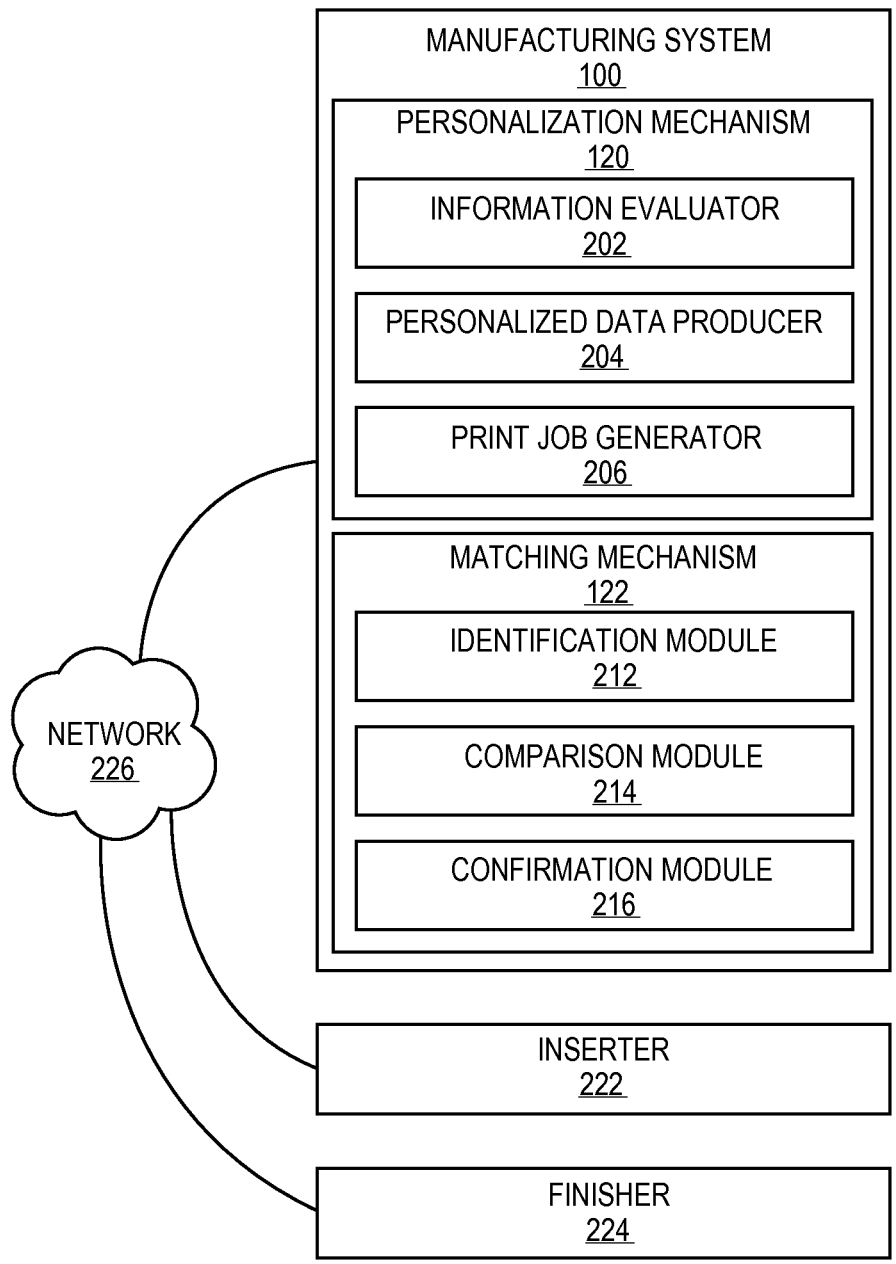
FIG. 2 illustrates an embodiment of personalization and matching mechanisms.

FIG. 2 illustrates an embodiment of personalization and matching mechanisms 102, 122. In one embodiment, personalization mechanism 120 is used for providing and generating personalization data relating to each mailpiece. In the illustrated embodiment, personalization mechanism 120 employs information evaluator 202 to read and analyze any relevant information (e.g., recipients' demographics, business and/or personal interests, geographic locations, etc.) as extracted from a database and/or fed through user input, etc., to determine the personalization content for a mailpiece. Some examples of personalization content include recipients' addresses on envelopes so as to eliminate the need for envelope windows, printing targeted marketing/advertisement messages and/or other messages (e.g., public announcements) on envelopes in text, graphics or images, etc., printing return addresses on envelopes targeted to each recipient or class of recipients, printing postage indicia on envelopes to remove the need for postage scales and meters for systems that can calculate postage for each envelope prior to envelope printing or manufacturing, or the like.

Personalization mechanism 120 further employs personalized data producer 204 to use the evaluated information to form and produce personalized data, such as recipient address, return addresses, advertising announcements, etc. Personalized data producer 204 associates various personal characteristics (e.g., receiver address, sender return address, etc.) with each mailpiece to generate mailpiece manufacturing parameters for each mailpiece that is then formed into a print job by print job generator 206. The print job may then be verified through matching mechanism 122 and then communicated with or forwarded onto other relevant manufacturing equipment, such as inserters 222, finishers 224, etc., that are in communication with manufacturing system 100 over a network 226 (e.g., Local Area Network (LAN), Wide Area Network (WAN), Personal Area Network (PAN), Metropolitan Area Network (MAN), intranet, and the Internet, etc.). In one embodiment, mailpiece manufacturing parameters may be communicated from manufacturing system 100 to matching mechanism 122 and further onto inserter 222 and finisher 224 using communication module 124 of FIG. 1.

As aforementioned, embodiments of the present invention are not limited to envelopes nor are they limited to particular types, forms or sizes of envelopes. Similarly, for example, embodiments are not limited to envelopes printed on a single white stock and may be equally applicable to envelopes printed on several stocks. Mailpiece manufacturing systems may employ a reprint mechanism to reprint mailpieces that are damaged during insertion or other production processes. The mailpieces for these reprints may be printed as a matching component using embodiments of the invention, or, for simplicity, the print center may choose to use non-personalized envelopes for reprints. Although personalization mechanism 120 and matching mechanism 122 are shown separately, it is contemplated that the two systems may be employed and/or operated as a single mechanism to facilitate various functionalities.

In one embodiment, matching mechanism 122 matches and verifies the personalized data-based print job received from personalization mechanism 120. For example, "matching jobs" may be performed by matching mechanism 122 to include one or more personalized mailpiece jobs as well as one or more personalized content jobs, such as components (e.g., inserts, such as advertisement or announcement inserts, outside prints on mailpieces, such as addresses, announcements, postage, toys, games, clothes, furniture, electronic equipment, fashion accessories, various types of gifts, etc.) and the corresponding mailpieces may be matched to verify (and/or produce) final personalized jobs using unique verification codes (e.g., barcodes) that allow a camera system (such as camera or scanning system 126 of FIG. 1) to scan the verification codes from each mailpiece (e.g., an envelope, a utility bill, an advertisement, etc.) and verify them to be present and correct. This positive-feedback helps ensure the integrity of all mailpiece components so that correct contents are mailed to the correct recipient.

It is contemplated that all types of envelopes, boxes or tubes (e.g., outer, remit, etc.) can be regarded as mailpieces and mail content inserts as content components that can be personalized and produced for each recipient or a group of recipients. It is further contemplated that content components may not have to be personalized even if the envelopes are personalized and vice versa. For example, an envelope may be personalized and manufactured with sender and receiver address and/or an announcement on the face of the envelope, but the content components may be inputted manually. Furthermore, barcodes are mentioned as an example but it is to be noted that embodiments are not limited to simply barcodes or any particular type of verification code and that other forms of matching controls may be used, such as a matching control file or a database to determine which components ought to belong together.

In one embodiment, identification module 212 may place a unique barcode on each matching content component (e.g., a telephone bill and an advertising insert specific to the receiver), where the unique barcode identifies the corresponding job and, for example, an envelope that is already printed with the receiver's and sender's addresses for each content component, such as an advertisement, an announcement, a telephone bill, etc. Each barcode of matching components may contain information that allows the matching system to recognize that the various content components belong together, such as through a sequence of mailpieces within an overall job, a unique identification (ID) associated with each content component and/or the corresponding envelope, etc. In another embodiment, identification module 212 may be used to identify unique barcodes already placed on mail content components and/or mail envelopes.

In one embodiment, comparison module 214 compares verification codes of each matching component to ensure that only the matching components are included in the same mailpiece, while confirmation module 216 confirms the comparisons by accepting or rejection them. As aforementioned, using identification module 212, unique identification codes, such as barcodes, may be placed on the outside of envelopes. Furthermore, in one embodiment, comingling of mailpieces from various sources may be allowed to, for example, accept one or more inserts from other sources.

Any number and type of manufacturing/production equipment or processes may be used with embodiments of the invention to produce personalized mail envelopes and mail content components, such as: (1) an offline envelope-making machine that can accept sheets or rolls of paper as input. Using the novel techniques of this invention, the inputted paper may be produced on color or monochrome digital presses and each envelope may be personalized for its corresponding content components. This way, no personalization may be performed by the offline envelope-making machine itself; (2) an inline envelope-making machine that are attached to inserters 222 and can also take sheets or rolls of paper as input. As with the offline machine, using the novel techniques of this invention, the inputted paper may be produced on color or monochrome digital presses and each envelope is personalized for its corresponding content components. This way, no personalization may be performed by the inline envelope-making machine itself; and (3) as with previous two examples, using the novel techniques as provided by embodiments of the present invention, the inputted prefabricated mail containers may be personalized on color or monochrome digital presses to their corresponding content components.

It is contemplated that any number and type of new components may be added to manufacturing system 100 and any of the existing components 202-206, 212-216 may be removed from or changed to perform a different operation, such as any one or more of components 202-206, 212-216 may be capable of assigning verification codes (e.g., barcodes), or the like, as necessitated or desired. It is contemplated that embodiments of the invention are not limited to any particular technology or standard and is dynamic enough to adopt and adapt to the changing technologies and standards.

Figure 3:
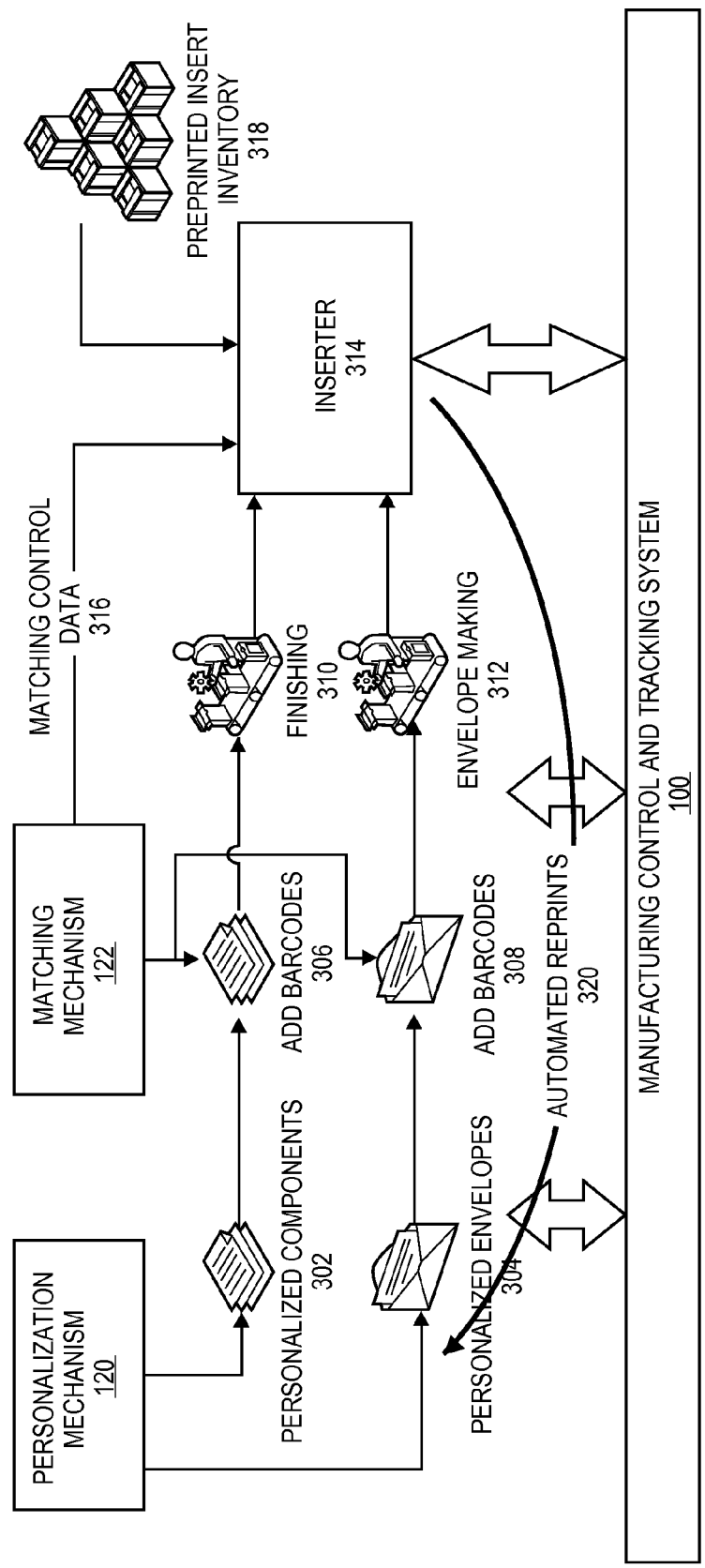
FIG. 3 illustrates an embodiment of a manufacturing system using personalization and matching mechanisms.

FIG. 3 illustrates an embodiment of a manufacturing system 100 using personalization and matching mechanisms 120, 122. For brevity, any details regarding personalization and matching mechanism 120, 122 as previously discussed with regard to FIG. 2 are not repeated here. Manufacturing and control tracking system 100, illustrated here, is the same as manufacturing system 100 of FIG. 1. In one embodiment, as explained with reference to FIGS. 1-2, mailpieces including mail content components 302 and mail envelopes 304 are personalized by personalization mechanism 120 and forwarded onto matching mechanism 122 for matching and verification purposes. At matching mechanism 122, unique verification codes, such as barcodes 306 and 308, are added to personalized content components 302 and personalized envelopes 304, respectively, and, using these barcodes 306 and 308, personalized content components 302 and matched with their corresponding envelopes 304. Once the matching process is completed by matching mechanism 122, the process continues with forwarding on of personalized content components 302 so they may be finished 310, while personalized envelopes 304 are sent for envelope making 312. Additionally, any relevant matching control data 316 may be supplied to the subsequent equipment (e.g., production or manufacturing or processing machines), such as inserter 314, in the process chain for final processing. Furthermore, any previously misprinted mailpieces may be supplied to inserter 314 as preprinted insert inventory 318 so there can be automated reprints 320 of the misprinted mailpieces.

Figure 4:
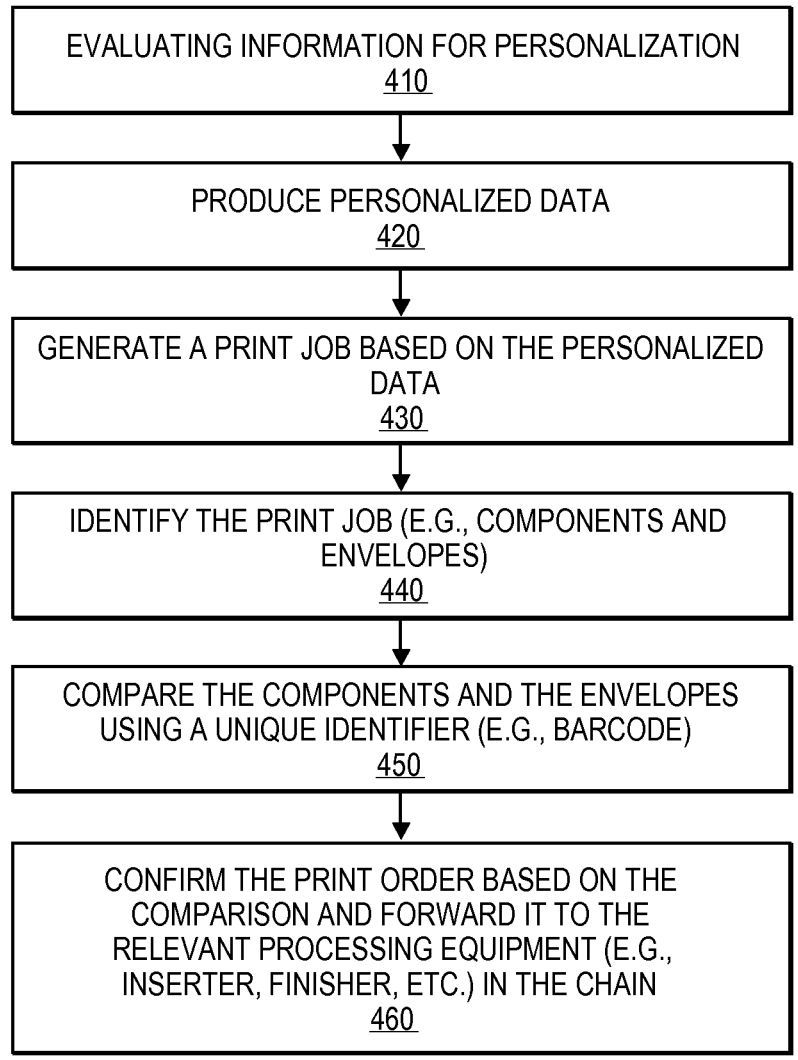
FIG. 4 illustrates an embodiment of a process for facilitating personalized mailpieces.

FIG. 4 illustrates an embodiment of a process for facilitating personalized mailpieces. At block 410, available information (e.g., at a database, obtained through user inputs and/or marketing surveys, etc.) is evaluated for personalizing mailpieces (e.g., mail content components, mail containers, etc.). At block 420, personalized data that is to be associated with mailpieces is produced. At block 430, a print job is printed based on the personalized data.

In one embodiment, at block 440, the print job identified. At block 450, using unique codes (e.g., barcodes), the mail components and their mail envelopes are compared to check whether they correspond to each other. These comparisons are either accepted or reject end and for each successful comparison, the print order is confirmed at block 460 and then forwarded on to the next manufacturing/processing equipment within the processing chain.

Figure 5:
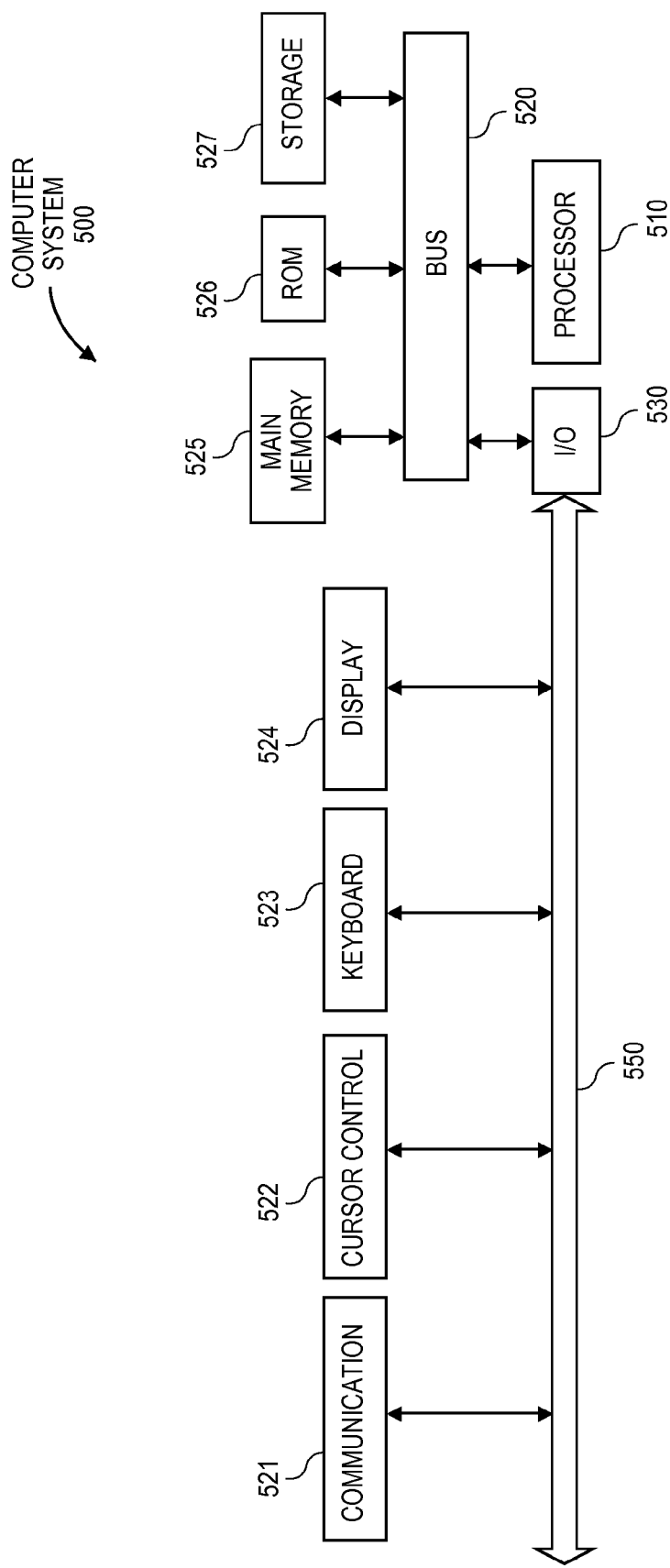
FIG. 5 illustrates an embodiment of a computer system.

FIG. 5 illustrates a computer system 500 on which manufacturing system 100 may be implemented. Computer system 500 includes a system bus 520 for communicating information, and a processor 510 coupled to bus 520 for processing information. Computer system 500 further comprises a random access memory (RAM) or other dynamic storage device 525 (referred to herein as main memory), coupled to bus 520 for storing information and instructions to be executed by processor 510. Main memory 525 also may be used for storing temporary variables or other intermediate information during execution of instructions by processor 510. Computer system 500 also may include a read only memory (ROM) and or other static storage device 526 coupled to bus 520 for storing static information and instructions used by processor 510.

A data storage device 525 such as a magnetic disk or optical disc and its corresponding drive may also be coupled to computer system 500 for storing information and instructions. Computer system 500 can also be coupled to a second I/O bus 550 via an I/O interface 530. A plurality of I/O devices may be coupled to I/O bus 550, including a display device 524, an input device (e.g., an alphanumeric input device 523 and or a cursor control device 522). The communication device 521 is for accessing other computers (servers or clients). The communication device 521 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A manufacturing system comprising:
    a personalization mechanism to evaluate personalization information relating to mailpieces, wherein the mailpieces include mail containers and mail content components;
    a matching mechanism to compare the containers with their corresponding content components using unique verification codes assigned to each of the containers and content components, wherein the unique verification codes are assigned based on the evaluated personalization information; and
    a production machine to produce personalized containers and their corresponding content components based on comparison results of the comparison, wherein the personalization mechanism and the matching mechanism reside at a print controller coupled to the production machine over a network, wherein the network includes the Internet.

2. The manufacturing system of claim 1, wherein the personalization mechanism is further to identify the personalization information obtained from one or more of a print data stream, a companion data source or file, a database, user input, and marketing survey.

3. The manufacturing system of claim 1, wherein the mailpieces are personalized based on the evaluated personalization information, and wherein the personalized mailpieces are provided to the matching mechanism as a print job.

4. The manufacturing system of claim 1, wherein the matching mechanism is further to receive the print job and assign unique verification codes to the containers and the content components identified in the print job.

5. The manufacturing system of claim 4, wherein the matching mechanism is further to read the unique verification codes and compare first unique verification codes assigned to the containers with second unique verification codes assigned to the content components.

6. The manufacturing system of claim 5, wherein the matching mechanism is further to confirm the comparison of the first and second unique verification codes and forward the print job to the production equipment.

7. The manufacturing system of claim 6, wherein the production system comprises one or more of an envelope maker, a finisher, and an inserter.

8. The manufacturing system of claim 5, wherein the unique verification codes comprise barcodes.

9. The manufacturing system of claim 1, wherein the mail content components comprise one or more of a utility bill, a credit card or financial statement, a letter, a commercial or political advertisement, a marketing insert, and a public announcement.

10. The manufacturing system of claim 1, wherein the mail containers comprise envelopes.

11. The manufacturing system of claim 1, wherein the personalization mechanism is further to track, via a page generator, responses to the displayed banner advertisements.

12. The manufacturing system of claim 1, wherein the print controller further comprises a camera mechanism to read the unique verification codes, and a communication module to facilitate communication of the print job and relevant data between the print controller and the production machine.

13. A method comprising:
evaluating personalization information relating to mailpieces, wherein the mailpieces include mail containers and mail content components;
comparing the containers with their corresponding content components using unique verification codes assigned to each of the containers and content components, wherein the unique verification codes are assigned based on the evaluated personalization information, wherein the containers and their corresponding content components are personalized based on comparison results of the comparison; and
producing, via a production machine, the personalized containers and content components, wherein the production machine comprises one or more of an envelope maker, a finisher, and an inserter.

14. The method of claim 13, further comprising identifying the personalization information obtained from one or more of a database, user input, and marketing survey.

15. The method of claim 13, wherein the mailpieces are personalized based on the evaluated information, and wherein the personalized mailpieces are provided to the matching mechanism as a print job.

16. The method of claim 13, further comprising receiving the print job and assign unique verification codes to the containers and the content components identified in the print job.

17. The method of claim 16, further comprising reading the unique verification codes and comparing first unique verification codes assigned to the containers with second unique verification codes assigned to the content components.

18. The method of claim 17, further comprising confirming the comparison of the first and second unique verification codes and forward the print job to the production machine.

19. The method of claim 17, wherein the unique verification codes comprise barcodes.

20. A multifunction manufacturing device comprising:
a controller to evaluate personalization information relating to mailpieces, wherein the mailpieces include mail containers and mail content components, and comparing the containers with their corresponding content components using unique verification codes assigned to each of the containers and content components, wherein the unique verification codes are assigned based on the evaluated personalization information, wherein the containers and their corresponding content components are personalized based on comparison results of the comparison,
wherein the controller is further to assign unique verification codes to the containers and the content components identified in the print job,
wherein the controller is further to read the unique verification codes and compare first unique verification codes assigned to the containers with second unique verification codes assigned to the content components,
wherein the controller is further to confirm the comparison of the first and second unique verification codes and forward the print job to a production machine, and
wherein the production machine to produce the personalized containers and content components, wherein the production machine comprises one or more of an envelope maker, a finisher, and an inserter.

21. The manufacturing device of claim 20, wherein the controller is further to identify the personalization information obtained from one or more of a database, user input, and marketing survey.

22. The manufacturing device of claim 20, wherein the mailpieces are personalized based on the evaluated information, and wherein the personalized mailpieces are provided to the matching mechanism as a print job.

23. The manufacturing device of claim 20, wherein the unique verification codes comprise barcodes.

24. A non-transitory machine-readable medium including data that, when accessed by a machine, cause the machine to perform one or more operations comprising:
evaluating personalization information relating to mailpieces, wherein the mailpieces include mail containers and mail content components;
comparing the containers with their corresponding content components using unique verification codes assigned to each of the containers and content components, wherein the unique verification codes are assigned based on the evaluated personalization information, wherein the containers and their corresponding content components are personalized based on comparison results of the comparison; and
producing, via a production machine, the personalized containers and content components, wherein the production machine comprises one or more of an envelope maker, a finisher, and an inserter.

25. The non-transitory machine-readable medium of claim 24, wherein the data when accessed, further causes the machine to perform operations comprising:
- receiving the print job and assign unique verification codes to the containers and the content components identified in the print job; and
- reading the unique verification codes and comparing first unique verification codes assigned to the containers with second unique verification codes assigned to the content components.

26. The non-transitory machine-readable medium of claim 25, wherein the data when accessed, further causes the machine to perform operations comprising:
- confirming the comparison of the first and second unique verification codes; and
- forwarding the print job to the production machine.

27. The non-transitory machine-readable medium of claim 24, wherein the unique verification codes comprise barcodes.

28. The non-transitory machine-readable medium of claim 24, wherein the data when accessed, further causes the machine to perform operations comprising: identifying the personalization information obtained from one or more of a database, user input, and marketing survey, and wherein the mailpieces are personalized based on the evaluated information, and wherein the personalized mailpieces are provided to the matching mechanism as a print job.

* * * * *